United States Patent
Singh et al.

(10) Patent No.: US 12,513,070 B1
(45) Date of Patent: Dec. 30, 2025

(54) METHODS, SYSTEMS, AND COMPUTER READABLE MEDIA FOR COMMUNICATING AND USING PRODUCER NETWORK FUNCTION (NF) NETWORK SLICE LEVEL LOAD INFORMATION

(71) Applicant: Oracle International Corporation, Redwood Shores, CA (US)

(72) Inventors: Virendra Singh, Bangalore (IN); Shashikiran Bhalachandra Mahalank, Bangalore (IN); Jay Rajput, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 85 days.

(21) Appl. No.: 18/755,429

(22) Filed: Jun. 26, 2024

(51) Int. Cl.
  *H04L 43/0882* (2022.01)
  *H04L 43/062* (2022.01)
  *H04L 47/24* (2022.01)

(52) U.S. Cl.
  CPC ........ *H04L 43/0882* (2013.01); *H04L 43/062* (2013.01); *H04L 47/24* (2013.01)

(58) Field of Classification Search
  CPC .. H04L 43/0882; H04L 43/062; H04L 437/24
  See application file for complete search history.

(56) References Cited

U.S. PATENT DOCUMENTS

| 10,361,843 B1 | 7/2019 | Suthar et al. |
| 11,671,369 B2 * | 6/2023 | Rajput ................... H04L 67/51 370/235 |

(Continued)

FOREIGN PATENT DOCUMENTS

| CN | 109429244 A | 3/2019 |
| CN | 112152855 A | 12/2020 |

(Continued)

OTHER PUBLICATIONS

"3rd Generation Partnership Project; Technical Specification Group Core Network and Terminals; 5G System; Network Function Repository Services; Stage 3 (Release 18)", 3GPP TS 29.510, V18.6.0, pp. 1412 (Mar. 2024).

(Continued)

*Primary Examiner* — Jerry B Dennison
(74) *Attorney, Agent, or Firm* — Jenkins, Taylor & Hunt, P.A.

(57) ABSTRACT

A method for communicating and using producer network function (NF) network slice level load information includes receiving, by a service communication proxy (SCP) and from a producer NF, a service-based interface (SBI) message including producer NF network slice level load information. The method further includes reading, by the SCP and from the SBI message, the producer NF network slice level load information. The method further includes communicating, by the SCP and to an NF repository function (NRF), the producer NF network slice level load information. The method further includes storing, by the NRF, the producer NF network slice level load information. The method further includes using, by the NRF, the producer NF network slice level load information to generate a response message to be sent to a consumer NF or the SCP.

20 Claims, 4 Drawing Sheets

(56) References Cited

U.S. PATENT DOCUMENTS

| | | |
|---|---|---|
| 11,906,261 B1 | 2/2024 | Mey et al. |
| 12,022,316 B2 * | 6/2024 | Srivastava ............. H04W 4/50 |
| 2019/0356558 A1 | 11/2019 | Han et al. |
| 2020/0178168 A1 | 6/2020 | Yang et al. |
| 2020/0267214 A1 | 8/2020 | Yang |
| 2021/0185695 A1 | 6/2021 | Gupta et al. |
| 2021/0337033 A1 * | 10/2021 | Madisetti ............ H04L 41/0806 |
| 2022/0053372 A1 * | 2/2022 | Shekhar ................. H04L 67/56 |
| 2022/0295386 A1 * | 9/2022 | Lu ........................... H04L 67/51 |
| 2022/0385581 A1 * | 12/2022 | Delos Reyes ......... H04L 43/062 |
| 2023/0025799 A1 | 1/2023 | Goel et al. |
| 2023/0143244 A1 * | 5/2023 | Bao ..................... H04L 65/1045 |
| 2025/0119373 A1 * | 4/2025 | Paczkowski ...... H04W 28/0268 |
| 2025/0193737 A1 * | 6/2025 | Krishan ................ H04W 48/18 |
| 2025/0294433 A1 * | 9/2025 | Khalil ................... H04W 48/16 |
| 2025/0334813 A1 * | 10/2025 | Xia .......................... G06F 3/16 |

FOREIGN PATENT DOCUMENTS

| | | | |
|---|---|---|---|
| EP | 3402232 B1 | 11/2019 | |
| EP | 3 648 525 A1 | 5/2020 | |
| WO | WO 2019024902 A1 | 2/2019 | |
| WO | WO-2021/054781 A1 | 3/2021 | |
| WO | WO 2023/003738 A1 | 1/2023 | |
| WO | WO-2025008875 A1 * | 1/2025 | ......... H04L 41/0856 |
| WO | WO-2025012936 A1 * | 1/2025 | ............ H04W 24/02 |

OTHER PUBLICATIONS

"3rd Generation Partnership Project; Technical Specification Group Services and System Aspects; System architecture for the 5G System (5GS); Stage 2 (Release 18)", 3GPP TS 23.501, V18.5.0 (Mar. 2024).

"Smart, Efficient and Dynamic End-to-End 5G Network Slicing Management", Amdocs, pp. 1-12 (2020).

Rivera, et al., "Network Slice Selection Function for Data Plane Slicing in a Mobile Network", The 20th Asia-Pacific Network Operations and Management Symposium, pp. 1-4 (2019).

Singh, et al., "SERENS: Self Regulating Network Slicing in 5G for Efficient Resource Utilization", IEEE, pp. 1-6 (2020).

Notice of Allowance for U.S. Appl. No. 17/382,299 (Oct. 10, 2023).

Advisory Action for U.S. Appl. No. 17/382,299 (Aug. 1, 2023).

Applicant-Initiated Interview Summary for U.S. Appl. No. 17/382,299 (Jun. 30, 2023).

Final Office Action for U.S. Appl. No. 17/382,299 (Apr. 13, 2023).

Applicant Initiated Interview Summary for U.S. Appl. No. 17/382,299 (Jan. 6, 2023).

"3rd Generation Partnership Project; Technical Specification Group Services and System Aspects; Management and orchestration; Provisioning; (Release 16)," 3GPP TS 28.531, V16.9.0, pp. 1-73 (Mar. 2021).

"3rd Generation Partnership Project; Technical Specification Group Core Network and Terminals; 5G System; Network Slice Selection Services; Stage 3 (Release 17)," 3GPP TS 29.531, V17.0.0, pp. 1-77 (Mar. 2021).

"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).

"3rd Generation Partnership Project; Technical Specification Group Services and System Aspects; System architecture for the 5G System (5GS); Stage 2 (Release 17)," 3GPP TS 23.501, V17.0.0, pp. 1-489 (Mar. 2021).

"3rd Generation Partnership Project; Technical Specification Group Services and System Aspects; Telecommunication management; Study on management and orchestration of network slicing for next generation network (Release 15)," 3GPP TR 28.801, V15.1.0, pp. 1-75 (Jan. 2018).

"3rd Generation Partnership Project; Technical Specification Group Services and S System Aspects; Telecommunication management; Add usecase and requirements for configuring ON with slice specific information (S5-171921)," 3GPP SA WG5 Meeting #112 (Mar. 2017).

International Search Report and Written Opinion corresponding to International Application No. PCT/US2022/037032 dated Sep. 29, 2022.

\* cited by examiner

METHODS, SYSTEMS, AND COMPUTER READABLE MEDIA FOR COMMUNICATING AND USING PRODUCER NETWORK FUNCTION (NF) NETWORK SLICE LEVEL LOAD INFORMATION

TECHNICAL FIELD

The subject matter described herein relates to communicating load information regarding network slices. More particularly, the subject matter described herein relates to methods, systems, and computer readable media for communicating and using network slice level load information for processing request messages from NF service consumers at the NF repository function (NRF).

BACKGROUND

In 5G telecommunications networks, a network function that provides service is referred to as a producer NF or service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides one or more services. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the types of services provided by an NF instance as well as contact and capacity information regarding the NF instance.

SCPs route messages between producer NF instances. An SCP can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instance.

One problem that can occur in 5G and subsequent generation networks is that the NRF may not have the current view of network slice level load information of producer NFs registered with the NRF, and, as a result, the NRF may incorrectly prioritize NF profiles of producer NFs in NF discovery responses. For example, producer NFs in a network served by an NRF may support multiple network slices. The producer NFs may identify the network slices that they serve to the NRF by sending NF profiles to the NRF during NF registration. The NF profiles may also include an NF instance level load attribute. However, the NF profiles may not include NF slice level load attributes. As a result, the NRF may not consider NF slice level loading when prioritizing the NF profiles in NF discovery responses transmitted to NF service consumers.

Producer NFs may communicate network slice level load information to consumer NFs using load control information (LCI) added to SBI request or response messages. However, the producer NF network slice level load information is not communicated to the NRF, which prevents the NRF from considering network slice level loading when prioritizing NF profiles in NF discovery responses. For example, suppose producer NFs NF1 and NF2 each support network slice 1. Suppose each of producer NFs NF1 and NF2 reserves 30% of its total capacity for network slice 1. If producer NF1 and producer NF2 have the same total capacity, but network slice 1 is more loaded on producer NF1 that producer NF2, then the NRF should prioritize producer NF2 over producer NF1 in an NF discovery response where network slice 1 is a query parameter. However, because the NRF lacks network slice level loading information, such network-slice-based prioritization is not possible.

Accordingly, in light of these and other difficulties, there exists a need for methods, systems and computer readable media for communicating and using producer NF network slice level load information.

SUMMARY

A method for communicating and using producer NF network slice level load information includes receiving, by an SCP and from a producer NF, an SBI message including producer NF network slice level load information. The method further includes reading, by the SCP and from the SBI message, the producer NF network slice level load information. The method further includes communicating, by the SCP and to an NRF, the producer NF network slice level load information. The method further includes storing, by the NRF, the producer NF network slice level load information. The method further includes using, by the NRF, the producer NF network slice level load information to generate a response message to be sent to a consumer NF or the SCP.

According to another aspect of the subject matter described herein, receiving an SBI message includes receiving an SBI message including a 3gpp-Sbi-Lci header.

According to another aspect of the subject matter described herein, reading the producer NF network slice level load information includes reading a relative capacity value associated with a network slice identifier from the 3gpp-Sbi-Lci header.

According to another aspect of the subject matter described herein, communicating the producer NF network slice level load information to the NRF includes generating an NF update request message, adding the producer NF network slice level load information to the NF update request message, and transmitting the NF update request message including the producer NF network slice level load information to the NRF.

According to another aspect of the subject matter described herein, adding the producer NF network slice level load information to the NF update request message comprises adding a custom header or information element (IE) to the NF update request message and adding the producer NF network slice level load information to the custom header or IE.

According to another aspect of the subject matter described herein, communicating the producer NF network slice level load information to the NRF includes generating an NF heart-beat request message, adding the producer NF network slice level load information to the NF heart-beat request message, and transmitting the NF heart-beat request message including the producer NF network slice level load information to the NRF.

According to another aspect of the subject matter described herein, adding the producer NF network slice level load information to the NF heart-beat request message comprises adding a custom header or information element (IE) to the NF heart-beat request message and adding the producer NF network slice level load information to the custom header or IE.

According to another aspect of the subject matter described herein, storing, by the NRF, the producer NF network slice level load information includes storing the producer NF network slice level load information in a custom attribute of an NF profile of the producer NF.

According to another aspect of the subject matter described herein, using the producer NF network slice level load information to generate the response message includes receiving, by the NRF and from the consumer NF or the SCP, an NF discovery request message including a network slice identifier, generating, by the NRF an NF discovery response message including NF profiles of producer NFs that serve a network slice identified by the network slice identifier, and setting, by the NRF and using the producer NF network slice level load information, priority values of the NF profiles.

According to another aspect of the subject matter described herein, setting the priority values of the NF profiles using the producer NF network slice level load information includes prioritizing an NF profile of a first producer NF that serves the network slice over an NF profile of a second producer NF that serves the network slice when the producer NF network slice level load information indicates that the first producer NF has more available capacity for the network slice than the second producer NF.

According to another aspect of the subject matter described herein, a system for communicating and using producer NF network slice level load information is provided. The system includes an SCP including at least one processor and a memory, the SCP being configured for receiving, from a producer NF, an SBI message including producer NF network slice level load information, reading, from the SBI message, the producer NF network slice level load information, and communicating the producer NF network slice level load information. The system further includes an NRF including at least one processor and a memory, the NRF being configured for receiving, from the SCP, the producer NF network slice level load information, storing the producer NF network slice level load information, and using the producer NF network slice level load information to generate a response message to be sent to a consumer NF or the SCP.

According to another aspect of the subject matter described herein, the SBI message includes a 3gpp-Sbi-Lci header and the SCP is configured to read the producer NF network slice level load information from the 3gpp-Sbi-Lci header.

According to another aspect of the subject matter described herein, the SCP is configured to communicate the producer NF network slice level load information to the NRF by generating an NF update request message, adding the producer NF network slice level load information to the NF update request message, and transmitting the NF update request message including the producer NF network slice level load information to the NRF.

According to another aspect of the subject matter described herein, the SCP is configured to add the producer NF network slice level load information to the NF update request message by adding a custom header or information element (IE) to the NF update request message and adding the producer NF network slice level load information to the custom header or IE.

According to another aspect of the subject matter described herein, the SCP is configured to communicate the producer NF network slice level load information to the NRF by generating an NF heart-beat request message, adding the producer NF network slice level load information to the NF heart-beat request message, and transmitting the NF heart-beat request message including the producer NF network slice level load information to the NRF.

According to another aspect of the subject matter described herein, the SCP is configured to add the producer NF network slice level load information to the NF heart-beat request message by adding a custom header or information element (IE) to the NF heart-beat request message and adding the producer NF network slice level load information to the custom header or IE.

According to another aspect of the subject matter described herein, the NRF is configured to store the producer NF network slice level load information in a custom attribute of an NF profile of the producer NF.

According to another aspect of the subject matter described herein, the NRF is configured to use the producer NF network slice level load information to generate the response message by receiving, by the NRF and from the consumer NF or the SCP, an NF discovery request message including a network slice identifier, generating, by the NRF an NF discovery response message including NF profiles of producer NFs that serve a network slice identified by the network slice identifier, and setting, by the NRF and using the producer NF network slice level load information, priority values of the NF profiles.

According to another aspect of the subject matter described herein, the NRF is configured to set the priority values of the NF profiles using the producer NF network slice level load information by prioritizing an NF profile of a first producer NF that serves the network slice over an NF profile of a second producer NF that serves the network slice when the producer NF network slice level load information indicates that the first producer NF has more available capacity for the network slice than the second producer NF.

According to another aspect of the subject matter described herein, one or more non-transitory computer readable media having stored thereon executable instructions that when executed by one or more processors of one or more computers control the one or more computers to perform steps are provided. The steps include receiving, by an SCP and from a producer NF, an SBI message including producer NF network slice level load information. The steps further include reading, by the SCP and from the SBI message, the producer NF network slice level load information. The steps further include communicating, by the SCP and to an NF repository function (NRF), the producer NF network slice level load information. The steps further include storing, by the NRF, the producer NF network slice level load information. The steps further include using, by the NRF, the producer NF network slice level load information to generate a response message to be sent to a consumer NF or the SCP.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
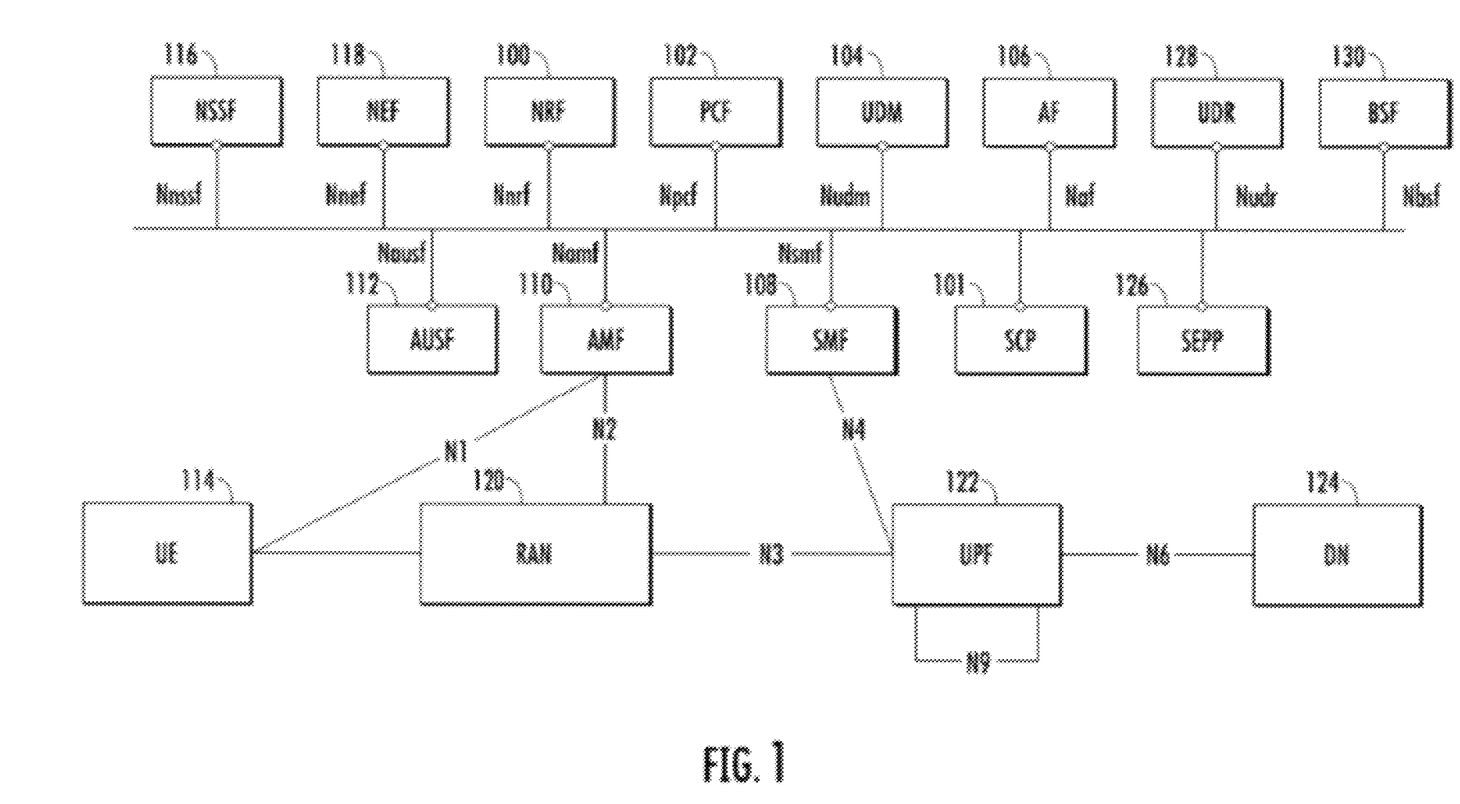
FIG. 1 is a network diagram illustrating an exemplary 5G system network architecture.

FIG. 1 is a network diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. To communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the types of services provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 provides authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

A SEPP 126 filters incoming traffic from another PLMN and can perform topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN. A SEPP filtering egress messages from consumer NFs in a PLMN is referred to as a consumer SEPP or C-SEPP. A SEPP that filters ingress messages directed to consumer NFs in a PLMN is referred to as a producer SEPP or P-SEPP. A given SEPP can function as a C-SEPP and a P-SEPP, depending on the role the SEPP is performing.

A unified data repository (UDR) 128 stores subscription data for UEs. A binding support function (BSF) 130 manages bindings between PDU sessions and PCFs.

As stated above, one problem with 5G and subsequent generation networks is the lack of producer NF network slice level load information at the NRF, resulting in incorrect prioritization of NF profiles in NF discovery responses. A single NF instance can serve multiple network slices and may have capacity reserved within the NF instance for each of the network slices, where each network slice is identified by an S-NSSAI. For example, an SMF instance can serve multiple S-NSSAIs. The NRF performs NF instance selection or NF service instance selection in response to receiving an NF discovery request for a specific S-NSSAI based on load, capacity and priority information received from each of the producer NF instance or producer NF service instance at the NF instance or NF service instance level as part of the NF registration or NF update procedure.

The NRF does not have a view of network slice level NF load information and hence does not consider the network slice level load for NF instance or NF service instance selection and prioritization when an NF discovery request is received from consumer NF or from an SCP performing delegated discovery for a specific S-NSSAI. NF instances or NF service instances selected by the NRF during NF discovery may be overloaded with respect to slice capacity reserved within the NF instance or NF service instance, although overall NF instance or NF service instance load may not be high. When the NRF sets the priority of the NF instance or NF service instance based on NF instance or NF service instance capacity, network slices may become overloaded.

The NRF may perform incorrect prioritization/selection of candidate producer NF instances or NF service instances in a discovery response without considering the slice level load information within the NF instance or NF service instance. Also, the NRF may not be able to perform proper load balancing of SBI traffic across producer NF instances or NF service instances for a specific S-NSSAI.

To address the aforementioned problems, the subject matter described herein utilizes the SCP to determine network slice level load information of producer NFs and communicate the network slice level load information to the NRF. The NRF may then use the network slice level load information in prioritizing NF profiles in NF discovery responses relating to particular network slices. 3GPP-defined LCI headers enable producer NF instances and service instances to communicate the current load information (and overload information) at slice level to consumer NFs; however, this slice level information is not currently available at the NRF. By making the network slice level load information available to the NRF, the NRF can use the network slice level load information in prioritizing NF profiles in NF discovery responses.

The following is an example of load control information for an SMF instance related to a particular S-NSSAI:

3gpp-Sbi-Lci: Timestamp: Tue, 4 Feb. 2020 08:49:37 GMT; Slice Load-Metric: 70%; NFInstance=54804518-4191-46b3-955c-ac631f953ed8; S-Nssai: {"sst": 1, "sd": "A08923"}; DNN: ciot.mnc012.mcc345.gprs; Relative-Capacity: 20%

In this example, SMF instance 54804518-4191-46b3-955c-ac631f953ed8 is 70% loaded for slice Id S-Nssai: {"sst": 1, "sd": "A08923"} within a reserved 20% capacity of overall NF capacity. In other words, the network slice is 70% loaded and has 20% of the overall capacity of the SMF. If the NF instance level capacity reported in the NF profile is 100, this means that the network slice has a reserved capacity of 20%*100=20. If the network slice is 70% loaded, then the available capacity of the network slice is 30%*20=6.

Without the subject matter described herein, the NRF is not aware of this slice level load information for NF instance or NF service instance selection. The solution described herein enables the SCP to propagate the network slice level load information for specific S-NSSAIs (network slice Ids) to the NRF, and the NRF can use the network slice level load information to prioritize the NF instance or NF service instances whose NF profiles are included in NF discovery responses when NF discovery requests are received for a specific slice.

In one example, the SCP updates the network slice level load information for producer NFs using NF update or NF heart-beat request messages transmitted to the NRF. The SCP may learn the network slice level load information from LCI headers transmitted by producer NFs to consumer NFs in SBI response messages or in SBI request messages, such as notification/callback request messages. The SCP may use custom IEs to carry the network slice level load information for different producer NFs as the part of NF update or NF heart-beat request messages. The NRF may perform NF profile selection for NF discovery responses based on the network slice level load information communicated by the SCP.

Table 1 shown below includes an example of network slice level load information that may be obtained, stored, and communicated by an SCP to the NRF.

TABLE 1

Network Slice Level and NF Profile Level Load Information

| NF Type | NF Instance or NF Service Instance ID | S-NSSAI | S-NSSAI Load Info based on SCP Updates (A) | Relative Capacity % for S-NSSAI based on SCP updates (B) | NF Instance or NF Service Instance Load (C) | NF Profile Capacity (D) | Reserved Slice Capacity (E) = (B)*(D) | Available Slice Capacity (100% − A)*(E) |
|---|---|---|---|---|---|---|---|---|
| SMF | X1 | A | 80% | 30% | 40% | 100 | 30 | 6 |
| SMF | Y1 | A | 20% | 30% | 45% | 100 | 30 | 24 |
| SMF | Z1 | A | 25% | 30% | 35% | 100 | 30 | 22.5 |

In Table 1, the first column is the NF type, which in this example is SMF. The second column is the NF instance or NF service instance ID, which in this example indicates three SMF instances: X1, Y1, and Z1. The third column lists the S-NSSAI or network slice Id, which, in the illustrated example is "A", meaning that slice A is supported by all three SMF instances. The fourth column includes the network slice level load information (as a percentage) obtained from updates generated by the SCP. The fifth column indicates the percentage of overall NF capacity reserved for network slice. The sixth column indicates the load on the NF instance or NF service instance. The seventh column indicates the capacity of the NF reported to the NRF in the NF profile. The eight column indicates the computed reserved capacity for the network slice identified in the third column.

The ninth column indicates the computed available capacity for the network slice. Based on the available slice capacity, the NRF would prioritize SMF Y1 first, SMF Z1 second, and SMF X1 third in an NF discovery response generated for an NF discovery request that specifies slice A as a query parameter.

Figure 2:
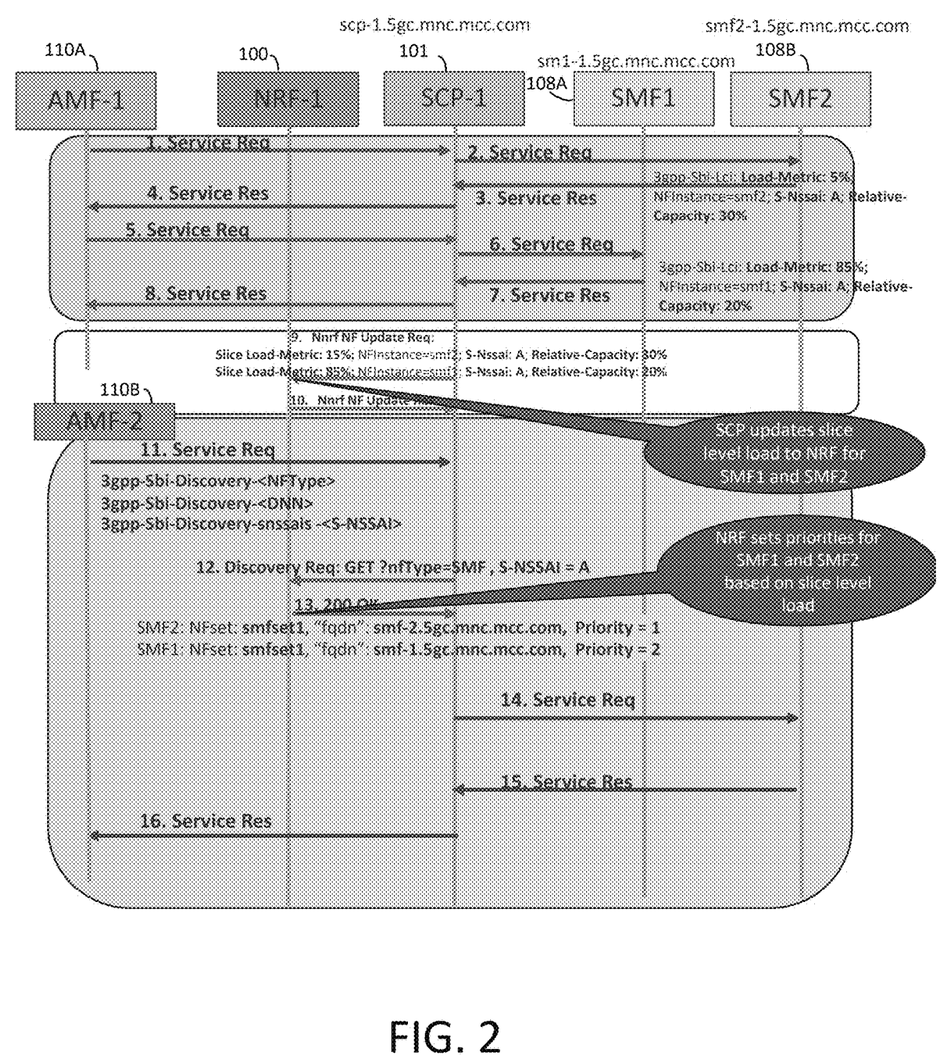
FIG. 2 is a message flow diagram illustrating the use of an SCP to communicate producer NF network slice level load information to the NRF and the use by the NRF of the network slice level load information to prioritize NF profiles in an NF discovery response.

FIG. 2 is a message flow diagram illustrating the use of an SCP to communicate producer NF network slice level load information to the NRF and the use by the NRF of the network slice level load information to prioritize NF profiles in an NF discovery response. In FIG. 2, an AMF 110A needs service from an SMF. In step 1, AMF 110A sends a service request to SMF 108B. In step 2, SCP 101 receives the service request and forwards the service request to SMF 108B. In step 3, SMF 108B generates a service response and transmits the service response to AMF 110B. SCP 101 receives the service response and reads the NF slice level load information from the response. In the illustrated example, the NF slice level load information of SMF 108B is as follows:

3gpp-Sbi-Lci: Load-Metric: 5%; NFInstance=smf2; S-Nssai: A; Relative-Capacity: 30%

The network slice load information is carried in the 3gpp-Sbi-Lci header and indicates that slice A of SMF 108B is 5% loaded and that slice A as a relative capacity of 30% of the total capacity of SMF 108B. SCP 101 stores the network slice level load information, and, in step 4, forwards the service response to AMF 110A.

In step 5, AMF 110A sends a service request to SMF 108A. In step 6, SCP 101 forwards the service request to SMF 108A. In step 7, SMF 108A generates a service response. The service response includes the following network slice level load information:

3gpp-Sbi-Lci: Load-Metric: 85%; NFInstance=smf1; S-Nssai: A; Relative-Capacity: 20%

The network slice level load information for slice A of SMF 108A indicates that slice A is 85% loaded and that 20% of the overall capacity of SMF 108A is reserved for slice A. In step 8, SCP 101 forwards the service response to AMF 110A.

In step 9, SCP 101 generates and sends an NF update request message including the network slice level load information of slice A supported by SMF 108A and SMF 108B to NRF 100. In one example, SCP 101 may add a custom header to the NF update request message and include the network slice level load information in the custom header. In another example, SCP 101 may add a custom JSON IE to the body of the NF update request message and include the network slice level load information in the custom JSON IE. NRF 100 receives the network slice level load information and stores the network slice level load information in a custom attribute in the NF profiles of SMF 108A and 108B. In step 10, NRF 100 generates and sends an NF update response to SCP 101.

In the example illustrated in step 9, an NF update request message is used to communicate the network slice level load information to the NRF. In an alternate example, SCP 101 may communicate the network slice level load information to NRF 100 in an NF heart-beat request message. As with the NF update request, SCP 101 may add the network slice level load information to a custom header or a custom JSON IE that is added to or included in the NF heart-beat request message.

In step 11, another AMF, AMF 110B, generates and sends a service request message to SCP 101. Because 3GPP communication model D is being used, the service request message includes NF discovery query parameters, which in step 11 include a network slice identifier of S-NSSAI=A, an NF type identifier, and a destination network name (DNN). SCP 101 receives the service request and generates an NF discovery request with the NF type identifier and the S-NSSAI from the service request. In step 12, SCP 101 transmits the NF discovery request to NRF 100.

NRF 100 receives the NF discovery request, reads the query parameters, accesses the NF profiles database, and locates the NF profiles of SMF 108A and SMF 108B as NF profiles of producer NF that provide service for network slice A. NRF 100 reads the network slice level load information from each of the NF profiles and uses the network slice level load information to set priority attribute values in the NF profiles. In the network slice level load information example, SMF 108B reported a network slice level load metric of 15% and a relative capacity of 30%. This means that the percentage of overall capacity of SMF 108B available to slice A is 0.85*0.3=25.5%. SMF 108A reported a network slice level load metric of 85% and a relative capacity of 20%. This means that the percentage of overall capacity of SMF 108A available to slice A is 0.15*0.2=3%. Assuming SMF 108A and 108B have the same capacities reported in their NF profiles, NRF 100 should prioritize the NF profile of SMF 108B over the NF profile of SMF 108A based on the network slice level load information. In step 13, NRF 100 generates and sends an NF discovery response to SCP 101. In the NF discovery response, NRF 100 sets the priority attribute value for SMF 108A to be 2 and the priority attribute value for SMF 108B to be 1 because SMF 108A has less available capacity (3%) for slice A than SMF 108B (25.5%).

Because SMF 108B is more preferred (lower priority value=more preferred), in step 14, SCP 101 transmits the service request to SMF 108B. In step 15, SMF 108B generates and transmits a service response to SCP 101. In step 16, SCP 101 forwards the service response to AMF 110B.

Although the example illustrated in FIG. 2 shows the communication and use of network slice level load information for the SCP to perform producer NF selection for a service request where 3GPP communication model D is used to discover the NF profiles of the producer NFs, the subject matter described herein is not limited to 3GPP communication model D. The subject matter described herein can also be used to set priorities of NF profiles where 3GPP communication model C is used. In 3GPP communication model C, the consumer NF, rather than the SCP, transmits the NF discovery request to the NRF. The SCP learns the NF slice level load information in the same manner as illustrated in FIG. 2 by receiving service requests or responses and reading the NF slice level load information from the service requests or responses. The NRF operates in the same manner illustrated in FIG. 2 by receiving the network slice level load information from the SCP, storing the network slice level load information in the NF profiles of the producer NFs, and using the network slice level load information to set priorities of the NF profiles in an NF discovery response. However, rather than transmitting the NF discovery response to SCP 101, NRF 100, in 3GPP communication model C, would transmit the NF discovery response to the consumer NF (AMF 110B). AMF 110B would then use the priorities of the NF profiles returned in the NF discovery response to perform producer NF selection, selecting SMF 108B. AMF 110B would then transmit the service request to SMF 108B.

Figure 3:
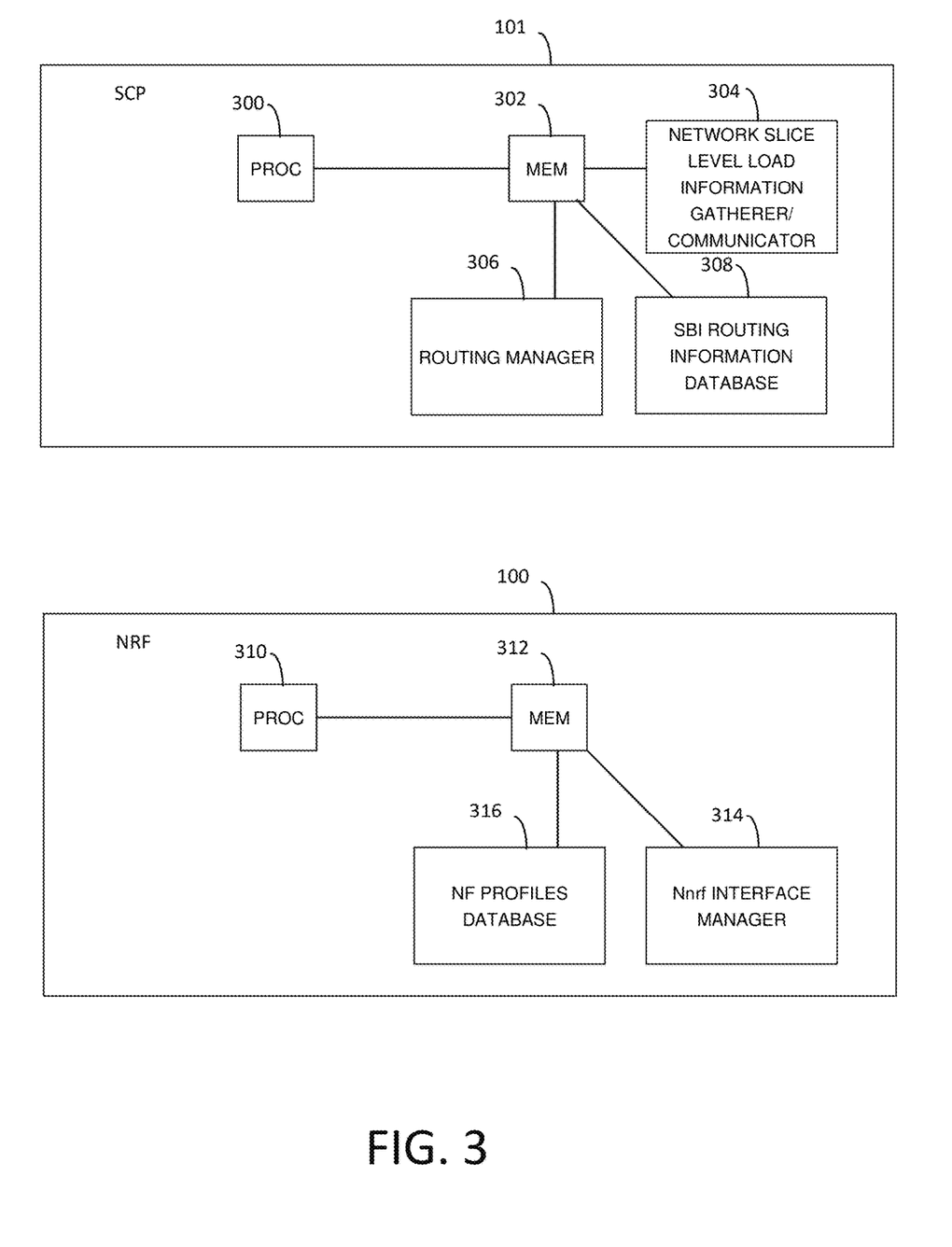
FIG. 3 is a block diagram illustrating exemplary architectures for an SCP and an NRF for communicating and using network slice level load information.

FIG. 3 is a block diagram illustrating exemplary architectures for an SCP and an NRF for communicating and using network slice level load information. Referring to FIG.

3, SCP 101 includes at least one processor 300 and memory 302. SCP 101 further includes a network slice level load information gatherer/communicator 304 that gathers network slice level load information from SBI messages and communicates the network slice level load information to NRF 100. SCP 101 further includes a routing manager 306 and an SBI routing information database 308. Routing manager 306 routes SBI request messages using the routing information stored in SBI routing information database 308. Network slice level load information gatherer/communicator 304 and routing manager 306 may be implemented using computer executable instructions stored in memory 302 and executed by processor 300.

NRF 100 includes at least one processor 310 and memory 312. NRF further includes an Nnrf interface manager that receives and processes messages received from other NFs. Nnrf interface manager 314 may receive, from SCP 101, NF update requests including network slice level load information and use the network slice level load information to update INF profiles in NF profiles database 316. Nnrf interface manager 314 may also receive and process NF discovery requests from SCPs and consumer NFs. As part of processing the NF discovery requests, Nnrf interface manager 314 may use the network slice level load information to set priorities of NF profiles to be returned in NF discovery responses. Nnrf interface manager 314 may be implemented using computer executable instruction stored in memory 312 and executed by processor 310.

Figure 4:
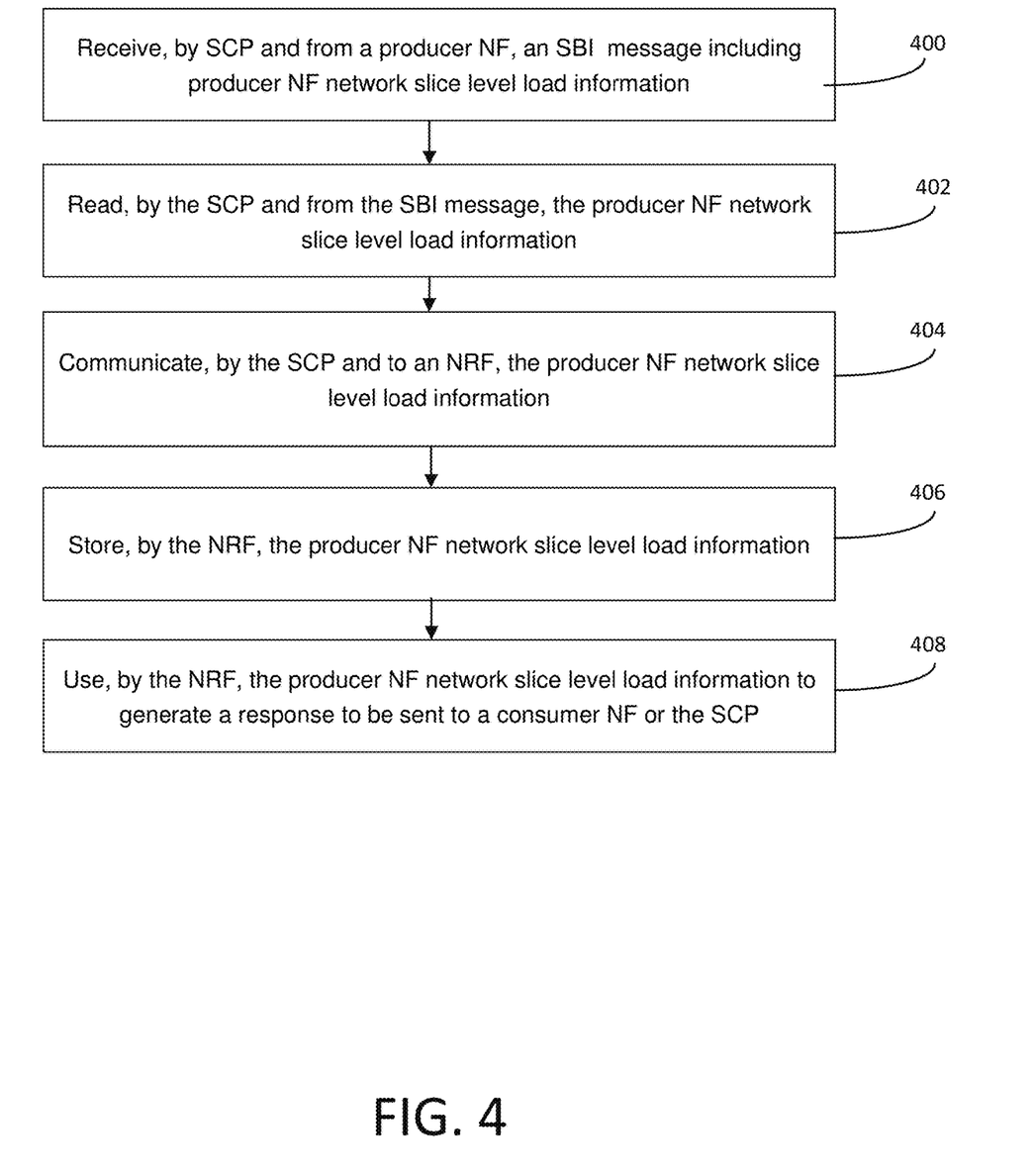
FIG. 4 is a flow chart illustrating an exemplary process for communicating and using network slice level load information.

FIG. 4 is a flow chart illustrating an exemplary process for communicating and using network slice level load information. Referring to FIG. 4, in step 400, the process includes receiving, by an SCP and from a producer NF, an SBI message including producer NF network slice level load information. For example, an SCP, such as SCP 101 may receive an SBI response message or an SBI request message, such as a notification/callback request message, transmitted from a producer NF to a consumer NF or SCP. The SBI response message may include a 3gpp-Sbi-Lci header including a network slice identifier (S-NSSAI) and load information for the network slice identified by the network slice identifier.

In step 402, the process further includes reading, by the SCP and from the SBI message, the producer NF network slice level load information. For example, an SCP, such as SCP 101 may read the network slice level load information from the 3gpp-Sbi-Lci header.

In step 404, the process further includes communicating, by the SCP and to an NRF, the producer NF network slice level load information. For example, and SCP, such as SCP 101 may generate an NF update request or an NF heart-beat request message, add a custom header or IE to the NF update or NF heart-beat request message, add the network slice level load information to the custom header or IE, and transmit the NF update request or NF heart-beat request message to the NRF.

In step 406, the process further includes storing, by the NRF, the producer NF network slice level load information. For example, an NRF, such as NRF 100, may receive the NF update request or NF heart-beat request message, read the network slice level load information from the custom header or IE, and store the network slice level load information as a custom attribute in the NF profile of the producer NF whose NF instance Id is included in the NF update request message.

In step 408, the process further includes using, by the NRF, the producer NF network slice level load information to generate a response to be sent to a consumer NF or the SCP. For example, an NRF, such as NRF 100, may receive an NF discovery request message including a network slice identifier as a query parameter. If 3GPP communication model C is being used, the NF discovery request message may originate from a consumer NF. If 3GPP communication model D is being used, the NF discovery request message may originate from an SCP. The NRF reads the NF slice identifier and the other query parameters from the NF discovery request, uses the parameters to locate NF profiles having attributes that match the query parameters, and generates an NF discovery response message including the NF profiles. The NRF sets the priority attribute values in the NF profiles to prioritize NF profiles that have more available capacity for the network slice over NF profiles that have less available capacity for the network slice. The NRF transmits the NF discovery response to the consumer NF or SCP. The consumer NF or SCP uses the priority values in the NF profile to select the producer NF with the highest priority (lowest priority attribute value) and sends a service request to the selected producer NF.

Exemplary advantages of the subject matter described herein include providing the ability to select and prioritize NF profiles at the NRF based on network slice level load information. Another advantage of the subject matter described herein is providing the ability for the consumer NF or SCP to select producer NF instance or producer NF service instances based on current slice level load information using NF discovery responses from the NRF. The subject matter described herein facilitates load balancing of SBI traffic across producer NF instance and producer NF service instances based on network slice level load information.

Another advantage or feature of the subject matter described herein is providing, by the SCP, real-time updates of network slice level load information to the NRF. The SCP obtains network slice level load information in real time from SBI messages transmitted by producer NFs. Providing this information to the NRF when an SBI message is received increases the likelihood that the network slice level load information maintained by the NRF is up to date. It has been observed in production networks that producer NF instances do not update their NF level load information to the NRF regularly or that these NF updates do not reach the NRF due to network issues. The subject matter described herein addresses this issue by providing network slice level (and NF profile level) load information from the SCP to the NRF when the SCP receives an SBI message from a producer NF. The subject matter described herein also reduces the likelihood of network outages due to improper SBI traffic distribution towards producer NF instances and producer NF service instances.

The disclosure of each of the following references is hereby incorporated herein by reference in its entirety.

REFERENCES 1. 3$^{rd}$ Generation Partnership Project; Technical Specification Group Core Network and Terminals; 5G System; Network Function Repository Services; Stage 3 (Release 18) 3GPP TS 29.510 V18.6.0 (2024-03)
2. 3$^{rd}$ Generation Partnership Project; Technical Specification Group Services and System Aspects; System Architecture for the 5G System (5GS); Stage 2 (Release 18) 3GPP TS 23.501 V18.5.0 (2024-03)

It will be understood that various details of the subject matter described herein may be changed without departing from the scope of the subject matter described herein.

Furthermore, the foregoing description is for the purpose of illustration only, and not for the purpose of limitation, as the subject matter described herein is defined by the claims as set forth hereinafter.

What is claimed is:

1. A method for communicating and using producer network function (NF) network slice level load information, the method comprising:
 receiving, by a service communication proxy (SCP) and from a producer NF, a service-based interface (SBI) message including producer NF network slice level load information;
 reading, by the SCP and from the SBI message, the producer NF network slice level load information;
 communicating, by the SCP and to an NF repository function (NRF), the producer NF network slice level load information;
 storing, by the NRF, the producer NF network slice level load information; and
 using, by the NRF, the producer NF network slice level load information to generate a response message to be sent to a consumer NF or the SCP.

2. The method of claim 1 wherein receiving an SBI message includes receiving an SBI message including a 3gpp-Sbi-Lci header.

3. The method of claim 2 wherein reading the producer NF network slice level load information includes reading a relative capacity value associated with a network slice identifier from the 3gpp-Sbi-Lci header.

4. The method of claim 1 wherein communicating the producer NF network slice level load information to the NRF includes generating an NF update request message, adding the producer NF network slice level load information to the NF update request message, and transmitting the NF update request message including the producer NF network slice level load information to the NRF.

5. The method of claim 4 wherein adding the producer NF network slice level load information to the NF update request message comprises adding a custom header or information element (IE) to the NF update request message and adding the producer NF network slice level load information to the custom header or IE.

6. The method of claim 1 wherein communicating the producer NF network slice level load information to the NRF includes generating an NF heart-beat request message, adding the producer NF network slice level load information to the NF heart-beat request message, and transmitting the NF heart-beat request message including the producer NF network slice level load information to the NRF.

7. The method of claim 6 wherein adding the producer NF network slice level load information to the NF heart-beat request message comprises adding a custom header or information element (IE) to the NF heart-beat request message and adding the producer NF network slice level load information to the custom header or IE.

8. The method of claim 1 wherein storing, by the NRF, the producer NF network slice level load information includes storing the producer NF network slice level load information in a custom attribute of an NF profile of the producer NF.

9. The method of claim 1 wherein using the producer NF network slice level load information to generate the response message comprises:
 receiving, by the NRF and from the consumer NF or the SCP, an NF discovery request message including a network slice identifier;
 generating, by the NRF an NF discovery response message including NF profiles of producer NFs that serve a network slice identified by the network slice identifier; and
 setting, by the NRF and using the producer NF network slice level load information, priority values of the NF profiles.

10. The method of claim 9 wherein setting the priority values of the NF profiles using the producer NF network slice level load information includes prioritizing an NF profile of a first producer NF that serves the network slice over an NF profile of a second producer NF that serves the network slice when the producer NF network slice level load information indicates that the first producer NF has more available capacity for the network slice than the second producer NF.

11. A system for communicating and using producer network function (NF) network slice level load information, the system comprising:
 a service communication proxy (SCP) including at least one processor and a memory, the SCP being configured for receiving, from a producer NF, a service-based interface (SBI) message including producer NF network slice level load information, reading, from the SBI message, the producer NF network slice level load information, and communicating the producer NF network slice level load information; and
 an NF repository function (NRF) including at least one processor and a memory, the NRF being configured for receiving, from the SCP, the producer NF network slice level load information, storing the producer NF network slice level load information, and using the producer NF network slice level load information to generate a response message to be sent to a consumer NF or the SCP.

12. The system of claim 11 wherein the SBI message includes a 3gpp-Sbi-Lci header and the SCP is configured to read the producer NF network slice level load information from the 3gpp-Sbi-Lci header.

13. The system of claim 11 wherein the SCP is configured to communicate the producer NF network slice level load information to the NRF by generating an NF update request message, adding the producer NF network slice level load information to the NF update request message, and transmitting the NF update request message including the producer NF network slice level load information to the NRF.

14. The system of claim 13 wherein the SCP is configured to add the producer NF network slice level load information to the NF update request message by adding a custom header or information element (IE) to the NF update request message and adding the producer NF network slice level load information to the custom header or IE.

15. The system of claim 11 wherein the SCP is configured to communicate the producer NF network slice level load information to the NRF by generating an NF heart-beat request message, adding the producer NF network slice level load information to the NF heart-beat request message, and transmitting the NF heart-beat request message including the producer NF network slice level load information to the NRF.

16. The system of claim 15 wherein the SCP is configured to add the producer NF network slice level load information to the NF heart-beat request message by adding a custom header or information element (IE) to the NF heart-beat request message and adding the producer NF network slice level load information to the custom header or IE.

17. The system of claim 11 wherein the NRF is configured to store the producer NF network slice level load information in a custom attribute of an NF profile of the producer NF.

18. The system of claim 11 wherein the NRF is configured to use the producer NF network slice level load information to generate the response message by:
    receiving, by the NRF and from the consumer NF or the SCP, an NF discovery request message including a network slice identifier;
    generating, by the NRF an NF discovery response message including NF profiles of producer NFs that serve a network slice identified by the network slice identifier; and
    setting, by the NRF and using the producer NF network slice level load information, priority values of the NF profiles.

19. The system of claim 18 wherein the NRF is configured to set the priority values of the NF profiles using the producer NF network slice level load information by prioritizing an NF profile of a first producer NF that serves the network slice over an NF profile of a second producer NF that serves the network slice when the producer NF network slice level load information indicates that the first producer NF has more available capacity for the network slice than the second producer NF.

20. One or more non-transitory computer readable media having stored thereon executable instructions that when executed by one or more processors of one or more computers control the one or more computers to perform steps comprising:
    receiving, by a service communication proxy (SCP) and from a producer network function (NF), a service-based interface (SBI) message including producer NF network slice level load information;
    reading, by the SCP and from the SBI message, the producer NF network slice level load information;
    communicating, by the SCP and to an NF repository function (NRF), the producer NF network slice level load information;
    storing, by the NRF, the producer NF network slice level load information; and
    using, by the NRF, the producer NF network slice level load information to generate a response message to be sent to a consumer NF or the SCP.

* * * * *